July 9, 1935.  J. G. BOSWELL  2,007,845
SALT DISPENSER
Filed Nov. 7, 1934
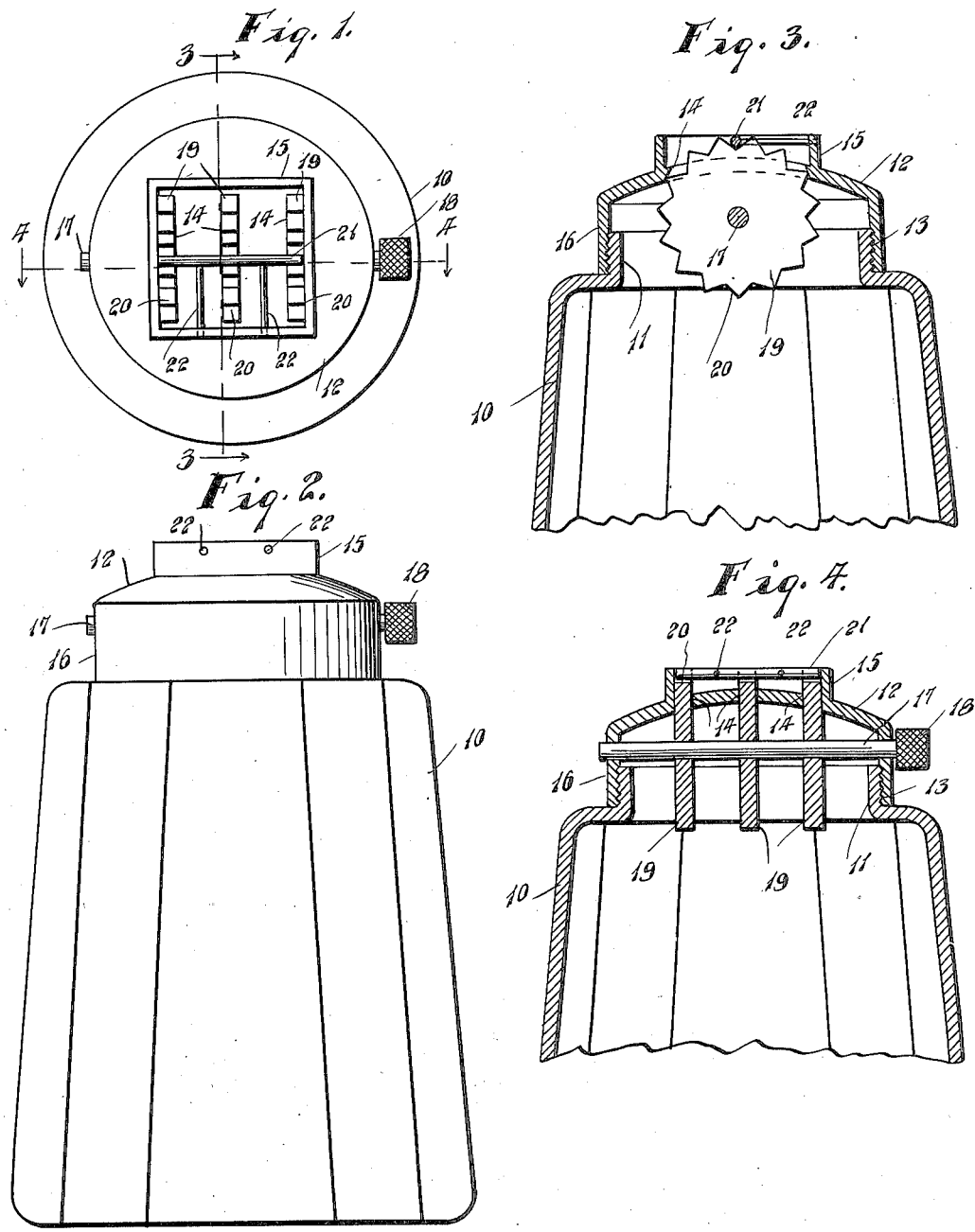
Inventor
J. G. Boswell.
By L. F. Randolph Jr.
Attorney Patented July 9, 1935

2,007,845

UNITED STATES PATENT OFFICE 2,007,845

SALT DISPENSER

James G. Boswell, Velasco, Tex., assignor of forty one-hundredths to William O. Smith, Velasco, Tex.

Application November 7, 1934, Serial No. 751,905

3 Claims. (Cl. 65—57)

The invention relates to dispensers for salt and other condiments and has for its object the provision of means for force feeding the salt or other condiment from the receptacle including toothed wheels for feeding the condiment from the receptacle.

As in devices of this character the condiment, and particularly salt, is liable when wet to be difficult to pour from the receptacle, and persons using the dispenser are liable to strike the top of the receptacle to jar the salt or other condiment loose, thus likely to cause damage to the toothed wheels, the invention includes a protecting flange extending outwardly from the top of the receptacle to prevent damage to the toothed wheels.

Furthermore, as salt or other condiments when wet are liable to stick to the toothed wheels, the invention includes a spring actuated bar engaging the edges of the toothed wheels, the spring arms supporting the bar being secured to said flange.

The invention will be described in detail hereinafter and will be found illustrated in the accompanying drawing, in which Figure 1 is a top plan view of the improved salt dispenser;

Figure 2 is a side view in elevation;

Figure 3 is a fragmentary vertical section on a plane indicated by the line 3—3 of Figure 1, and Figure 4 a similar view on a plane indicated by the line 4—4 of Figure 1.

In the drawing similar reference characters are used to designate corresponding parts throughout the several views.

In the drawing a condiment receptacle 10 is provided with a neck 11 on which is mounted a flanged cover or top 12, the means for securing the flanged top 12 on the neck 11 being shown in the drawing as interengaging threads 13, but obviously any other means for holding the top on the neck may be substituted therefor.

The top 12 is provided with a plurality of slots 14, and an outwardly extending flange 15 surrounding said slots 14 and being preferably rectangular in contour as shown in Figure 1.

Rotatably journaled in the flanges 16 of the top 12 is a shaft 17, having at one or both of its ends a knurled knob 18 for manual rotation of said shaft. Secured to the shaft 17 and rotatable therewith are a plurality of wheels 19 having toothed peripheries 20, the function of said toothed wheels, as they are mounted in the slots 14 being to force feed the salt or other condiment from the receptacle 10.

As at times when the condiment in the receptacle, and particularly salt, when wet, will not readily be discharged by means of the toothed wheels 19, and to prevent injury to the wheels should the user strike the face of the top, it will be apparent that the flange 15 will prevent injury to the wheels, as the outer edge of the flange is arranged on a plane coincident with the plane of the periphery of said wheels, or preferably may be made to extend beyond the plane of the wheels.

Furthermore, as salt when wet is liable to stick to the surface of the teeth 20, provision is made for discharging the salt from the edges of the wheels consisting in providing a bar 21 that rides on the surfaces of the teeth, and mounting said bar on the free end of the spring arms 22, said spring arms being secured to the flange 15.

What is claimed is:—

1. A condiment dispenser, comprising a top adapted to be mounted on a receptacle and having a slot therein, a shaft journaled in said top, a toothed wheel secured to said shaft, operatively mounted in said slot and projecting outwardly of said top, a flange mounted on and extending outwardly from said top and surrounding said slot, the free edge of said flange being on a plane corresponding to the periphery of the toothed wheel to protect the wheel.

2. A condiment dispenser, comprising a top adapted to be mounted on a receptacle and having an opening therein, a shaft journaled in said top, a toothed wheel secured to said shaft and operatively mounted in said opening, a bar riding on the periphery of the toothed wheel to dislodge material deposited thereon, and spring arms connecting the bar and top to hold the bar in engagement with the teeth on the wheel to dislodge material therefrom.

3. A condiment dispenser, comprising a top adapted to be mounted on a receptacle and having a plurality of substantially parallel slots therein, a shaft journaled in said top, spaced toothed wheels secured to said shaft and operatively mounted in said slots, a flange extending outwardly from said top and surrounding said slots, a bar riding on said toothed wheels, and spring arms connecting said flange and bar to hold the bar in engagement with the teeth on the wheels to dislodge material therefrom.

JAMES G. BOSWELL.